US009359749B1

(12) United States Patent
Mellits et al.

(10) Patent No.: US 9,359,749 B1
(45) Date of Patent: Jun. 7, 2016

(54) AIR-GAP FAUCET

(71) Applicant: Symmons Industries, Inc., Braintree, MA (US)

(72) Inventors: Kirk Mellits, Braintree, MA (US); Jeff Peltier, Richmond, RI (US); Hai Le, Pawtucket, RI (US); Steve Ferreira, North Dighton, MA (US)

(73) Assignee: Symmons Industries, Inc., Braintree, MA (US)

( * ) Notice: Subject to any disclaimer, the term of this patent is extended or adjusted under 35 U.S.C. 154(b) by 0 days.

(21) Appl. No.: 14/833,783

(22) Filed: Aug. 24, 2015

(51) Int. Cl.
E03C 1/10 (2006.01)
F16K 24/00 (2006.01)
E03C 1/04 (2006.01)
E03C 1/02 (2006.01)

(52) U.S. Cl.
CPC . *E03C 1/102* (2013.01); *E03C 1/04* (2013.01); *E03C 2001/026* (2013.01)

(58) Field of Classification Search
CPC ................................... E03C 1/102; E03C 1/04
See application file for complete search history.

(56) References Cited

U.S. PATENT DOCUMENTS

| | | | | |
|---|---|---|---|---|
| 4,134,419 A | * | 1/1979 | Richetti | F16K 24/06 137/216 |
| 4,771,485 A | * | 9/1988 | Traylor | E03C 1/0401 137/216 |
| 4,856,121 A | * | 8/1989 | Traylor | E03C 1/0401 137/216 |
| 5,176,165 A | * | 1/1993 | Traylor | E03C 1/102 137/216 |
| 5,865,209 A | * | 2/1999 | Vidal | E03C 1/102 137/216 |
| 5,875,809 A | | 3/1999 | Barrom | |
| 5,915,406 A | * | 6/1999 | Traylor | E03C 1/102 137/216 |
| 6,499,501 B1 | | 12/2002 | Hoeptner, III | |
| 7,353,838 B2 | | 4/2008 | Schmitt et al. | |
| 7,357,147 B2 | | 4/2008 | Kawolics et al. | |
| 7,828,970 B2 | | 11/2010 | Kloos et al. | |
| 8,733,386 B2 | | 5/2014 | Sun | |
| 2006/0157109 A1 | | 7/2006 | Vu | |
| 2010/0018927 A1 | | 1/2010 | Poole | |
| 2014/0215709 A1 | * | 8/2014 | Nightlinger | E03C 1/04 4/677 |

* cited by examiner

*Primary Examiner* — Craig Schneider
*Assistant Examiner* — Kevin Barss
(74) *Attorney, Agent, or Firm* — Goodwin Procter LLP

(57) ABSTRACT

An air-gap device integrated within a faucet base of a faucet fixture for use with a dishwashing device is disposable on a counter surface and includes: a base forming flow channels adapted to provide a fluid-tight seal at the surface; a fixed block wall extending from the base, the fixed block wall separating a first pair of flow channels from a second pair of flow channels and providing a fluid-tight seal for the first pair of the flow channels; and a removable block cover selectively attachable to the fixed block wall to fluidicly couple the second pair of flow channels, the block cover further forming an air-gap channel in fluidic communication with ambient. Modular design permits removal of the faucet and valve portion to access the air-gap device for maintenance, without the need to disconnect any fluid supply or waste lines.

30 Claims, 6 Drawing Sheets

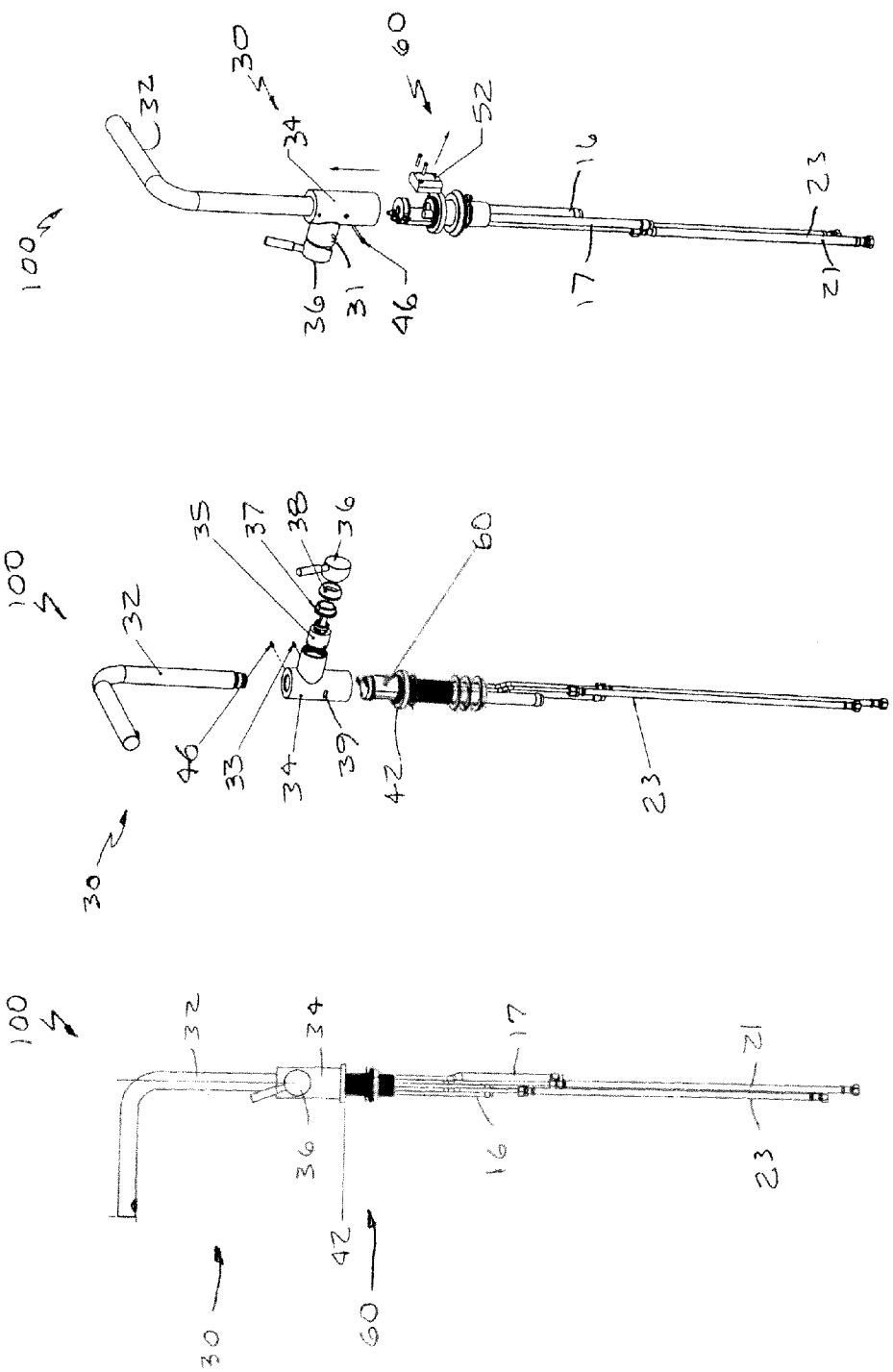

AIR-GAP FAUCET

FIELD OF THE INVENTION

The present invention relates to an air-gap device and, more specifically, an air-gap device that may be integrated into a faucet for use with a dishwashing device.

BACKGROUND OF THE INVENTION

Conventionally, air-gap devices may be installed in plumbing waste lines as a safety device to prevent drain water from entering a clean water system. Typically, the air-gap device is installed upstream of a drain to prevent back up of drain water into a clean water system or conduit. As the name suggests, and as shown in FIGS. 1A and 1B, conventional air-gap devices 10 include an open space at ambient conditions (the "air-gap" 15) between an outlet 11 of a first fluid conduit 12 and an inlet 13 of a second fluid conduit 14. As a result, if the unpressurized drain, or second fluid, line 14 were to become stopped or clogged (e.g., by small pieces of food), the air-gap device 10 would leak incoming water from the pressurized first fluid conduit 12 via the air-gap 15 into a nearby sink 19 or other water reservoir.

Air-gaps have been incorporated or integrated into various faucets or spouts connected to under-sink appliances, e.g., instant hot water heaters and reverse osmosis (RO) units. In these applications, the air-gap prevents waste fluid from being forced or siphoned back into the storage tank or reservoir of the under sink appliance.

Many U.S. states and cities, such as California, require plumbing of new homes to include an air-gap device 10 between a drain hose 17 of a dishwashing device, such as a dishwasher 18, and its drain line 16. This requires providing, in a kitchen counter top 22, a first opening 24 for receiving a conventional hot and cold water faucet 20 and another opening 26 for receiving the air-gap device 10. Advantageously, installing an air-gap device 10 above the counter top 22 prevents a clogged drain or sink 19 backup directing contaminated water back into the dishwasher 18. This arrangement has several disadvantages.

First, it requires providing in the counter top 22, e.g., by coring, by drilling, and the like, an additional opening 26 at a precise location about the opening 28 for the sink 19. Second, typically, the air-gap device 10 cannot be disposed immediately adjacent to the sink 19, hence, the air-gap device 10 is located a short distance 29 from the sink 19, which means that leaking or weeping drain water from the air-gap device 10 must travel over the counter top 22 for some distance 29 before it enters the sink 19, if it drains into the sink 19 at all. Finally, the air-gap device 10 can be noisy, unsightly, and a nuisance when trying to clean around the sink 19.

BRIEF SUMMARY OF THE INVENTION

Accordingly, it is desirable to provide an air-gap device—especially an air-gap device for a dishwasher—that is structured and arranged to be installed within a faucet, to minimize these above and other disadvantages.

In a first aspect, the present invention provides a modular air-gap device that is disposable on a surface within a faucet base housing of a faucet fixture. In some embodiments, the air-gap device includes a base forming flow channels; a fixed block wall extending from the base, the fixed block wall separating a first pair of flow channels from a second pair of flow channels and providing a fluid-tight seal for the first pair of the flow channels; and a removable block cover selectively attachable to the fixed block wall to couple, e.g., fluidicly, the second pair of flow channels, the cover forming an air-gap channel in fluidic communication with ambient to avoid spatter. In some implementations, the first pair of flow channels is structured and arranged to connect to a cold water supply line and a hot water supply line and/or the second pair of flow channels is structured and arranged to connect to a, e.g., pressurized, waste water line and a drain line. In some variations, the drain line has an inner diameter that is greater than an inner diameter of the waste water line.

In some implementations, the air-gap channel may be substantially U-shaped, such that the U-shaped air-gap channel includes a pair of legs of unequal length with a longer leg of the U-shaped air-gap channel directing fluid flow to a drain line and a shorter leg of the U-shaped air-gap channel receiving flow from a waste water line.

In some implementations, the removable block cover may form an aperture, which may be formed proximate a drain line, to provide fluidic communication between the second pair of flow channels and ambient. In some variations, the air-gap device also may include conduits extending from the base and in fluid communication with a corresponding flow channel.

In a second aspect, the present invention provides a faucet having an air-gap feature. In some embodiments, the faucet includes a fluid-carrying spigot having an inlet and an outlet for communicating a fluid therethrough; a valve in fluidic communication with the inlet of the spigot for selectively controlling a flow rate and/or a temperature of the fluid; a faucet base housing having an overflow discharge outlet formed therethrough; and an air-gap device disposable on a surface and within the faucet base housing. In some implementations, the air-gap device includes a base forming flow channels; a fixed block wall extending from the base, the fixed block wall separating a first pair of flow channels from a second pair of flow channels and providing a fluid-tight seal for the first pair of the flow channels; a removable block cover selectively attachable to the fixed block wall to fluidicly couple the second pair of flow channels; and a crown portion extending from the fixed block wall. In some implementations, the removable block cover may form an aperture, which may be formed proximate a drain line. In some variations, the first pair of flow channels may be structured and arranged to connect to a cold water supply line and a hot water supply line and/or the second pair of flow channels may be structured and arranged to connect to a waste water line and a drain line. The drain line may also have an inner diameter that is greater than an inner diameter of the waste water line. In some variations, the faucet may include conduits in fluid communication with a corresponding flow channel and extending from the air-gap base.

In some variations, the block cover forms an air-gap channel in fluidic communication with ambient and the air-gap flow channel may be in fluidic communication with the overflow discharge outlet in the faucet base.

In some implementations, the faucet base housing may be removably coupled to the crown portion with a fastening device. Moreover, the faucet may include a first seal and a second seal to direct overflow from the air-gap flow channel to the overflow discharge outlet in the faucet base housing. For example, the first seal may be removably attached to the air-gap base and/or the second seal may be removably attached to the crown portion.

In some implementations, the air-gap channel may be substantially U-shaped such that the U-shaped air-gap channel may include a pair of legs of unequal length with a longer leg of the U-shaped air-gap channel directing fluid flow to a drain line and a shorter leg of the U-shaped air-gap channel receiving flow from a waste water line.

In a third aspect, a method is described for accessing an obstructed fluid flow channel within a faucet having a faucet base housing and an air-gap device including a base forming a plurality of flow channels; a fixed block wall extending from the base, the fixed block wall separating a first pair of flow channels from a second pair of flow channels and providing a fluid-tight seal for the first pair of the flow channels; and a removable block cover selectively attachable to the fixed block wall to fluidically couple the second pair of flow channels, the cover forming an air-gap channel in fluidic communication with ambient. In some embodiments, the method includes removing the faucet base housing and removing the block cover of the air-gap device. In some variations, removing the block cover includes removing securing devices that secure the block cover to the fixed block wall.

In some implementations removing the faucet base housing and the removable block cover may be both performed above a sink counter level and/or removing the faucet base housing and the block cover may be performed without detaching any fluid lines from the faucet.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 2A shows a side view of an illustrative embodiment of a faucet integrated with an air-gap device in accordance with the present invention;

FIG. 2B shows an exploded perspective view of an illustrative embodiment of a faucet integrated with an air-gap device in accordance with the present invention;

FIG. 2C shows a rear perspective, partially disassembled view of an illustrative embodiment of a faucet integrated with an air-gap device with a faucet base housing and a removable block access cover removed, in accordance with the present invention;

DETAILED DESCRIPTION OF THE INVENTION

Figure 1A:
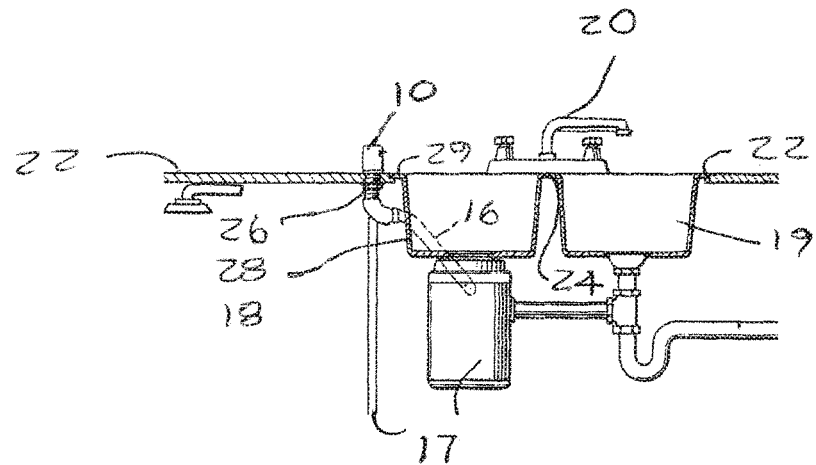
FIG. 1A shows a conventional arrangement of a sink faucet and a separate air-gap device for use with a dishwashing device in accordance with the prior art.

An embodiment of a combined faucet and air-gap device for an appliance, e.g., dishwasher, reverse osmosis (RO) unit, instant hot water unit, and the like, are described with reference to FIGS. 2A through 2C. For ease of description, the kitchen appliance will be a dishwasher 18 (FIG. 1A). However, those of ordinary skill in the art can appreciate the wide variety of appliances that may be fluidly coupled to an air-gap device.

In some embodiments, the faucet/air-gap device 100 (hereinafter the "device") may include an upper faucet assembly 30 and an air-gap portion 60 to which a plurality of fluid conduit lines 16, 17, 21, and 23 is fluidicly coupled or connected. For example, in addition to having a hot water conduit 21 and a cold water conduit 23 (hereinafter "lines") for fluidicly coupling or connecting to a hot water source and a cold water source, respectively, an inflow conduit 17 and an output or drain conduit 16 may be fluidicly coupled or connected to the device 100. More specifically, the inflow conduit 17, which may be fluidicly coupled to a pressurized drain line of a dishwasher 18, and an output or drain conduit 16, which may be fluidicly coupled or connected to a gravity drain, e.g., a sink drain or an in-sink garbage disposal, may be fluidicly coupled or connected to the air-gap portion 60 of the device 100, while the hot and cold water lines 21, 23 may be fluidicly coupled or connected to the upper faucet assembly 30, e.g., via the air-gap portion 60.

In some implementations, the upper faucet assembly 30 includes a tubular spigot 32, a base housing 34, and a fluid mixing handle 36 coupled to hot and cold water valves. Although FIGS. 2A through 2C show a ball-type mixing valve handle 36, those of ordinary skill in the art can appreciate that the invention is not to be construed as being limited thereto. The upper faucet assembly 30 may include other handle, e.g., translation-type mixing valve handles, and/or housing/body styles.

Faucets are well-known to those skilled in the art; hence, the conventional features of the upper faucet assembly 30 of the present invention will not be described in detail. Advantageously, faucet/air-gap system 100 enables one to install and plumb all of the supply lines and drain conduits to the system 100 without the spout 32 being attached to the base housing 34, which facilitates installation. Furthermore, the modular nature of the present invention, including, for example, a base flange 42 and the air-gap portion 60, provides a customization feature by enabling users to combine the base flange 42 and the air-gap portion 60 with a multiplicity of spigots 32, faucet base housings 34, and mixing valves with handles 36. In short, one air-gap portion 60 size may fit multiple upper faucet assemblies 30 of various styles and designs.

In some variations, the base housing 34 is generally a hollow shell having a top opening through which the spigot 32 may be fluidically coupled or connected to the hot and cold water lines 21, 23 via corresponding ports; a hollow arm portion 31 through and into which a valve cartridge or valve 35, a compression nut 37, and a handle dome 38 may be disposed for controlling flow and water temperature; and an overflow discharge outlet 39, which will be described in greater detail below.

A proximal end of the valve 35 may be mechanically coupled to the fluid mixing handle 36, so that manipulation, e.g., by translation and/or by rotation, of the handle 36 makes adjustments to the distal end of the valve 35, controlling the mixture and quantities of hot and cold water delivered to the spigot 32. In some variations, the compression nut 37, the dome 38, and the handle 36 may be removably attached, e.g., using a fastening device (e.g., set screw, bolt, and the like) 33, to and within the plenum of the hollow arm portion 31, providing a fluid-tight seal.

Figure 1B:
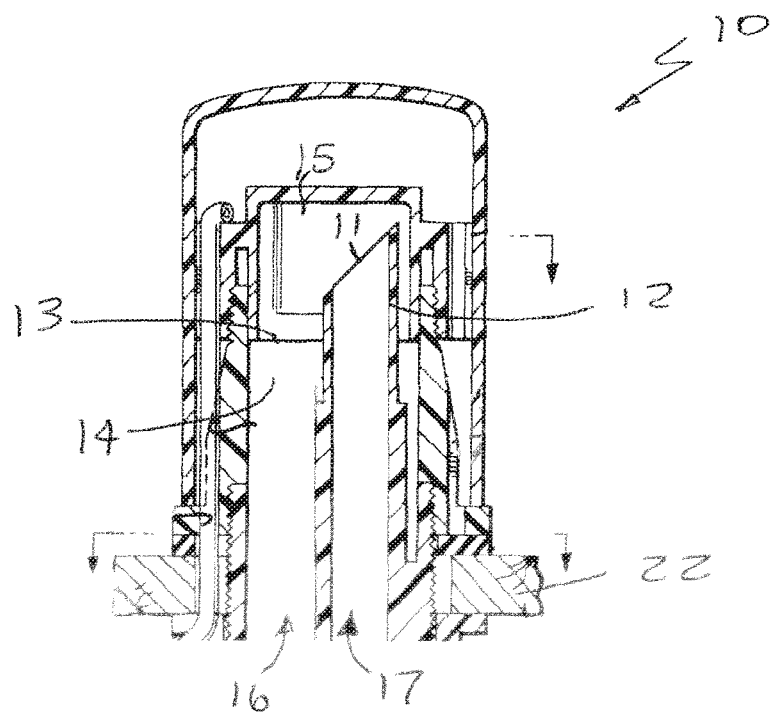
FIG. 1B shows an exemplary embodiment of an air-gap device for use with a dishwashing device in accordance with the prior art.
Figure 3:
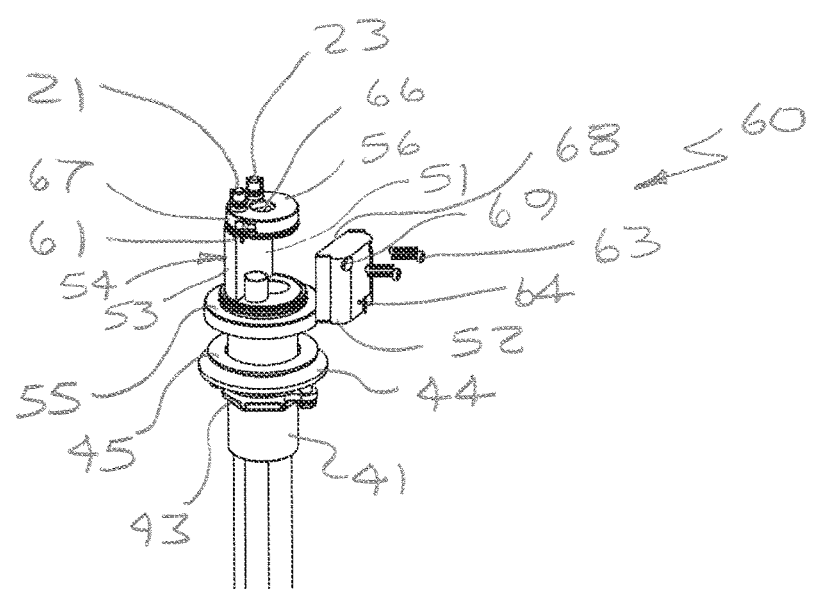
FIG. 3 shows the air-gap device from FIG. 2C with the removable block access cover removed from the air-gap device in accordance with some embodiments of the present invention.
Figure 4A:
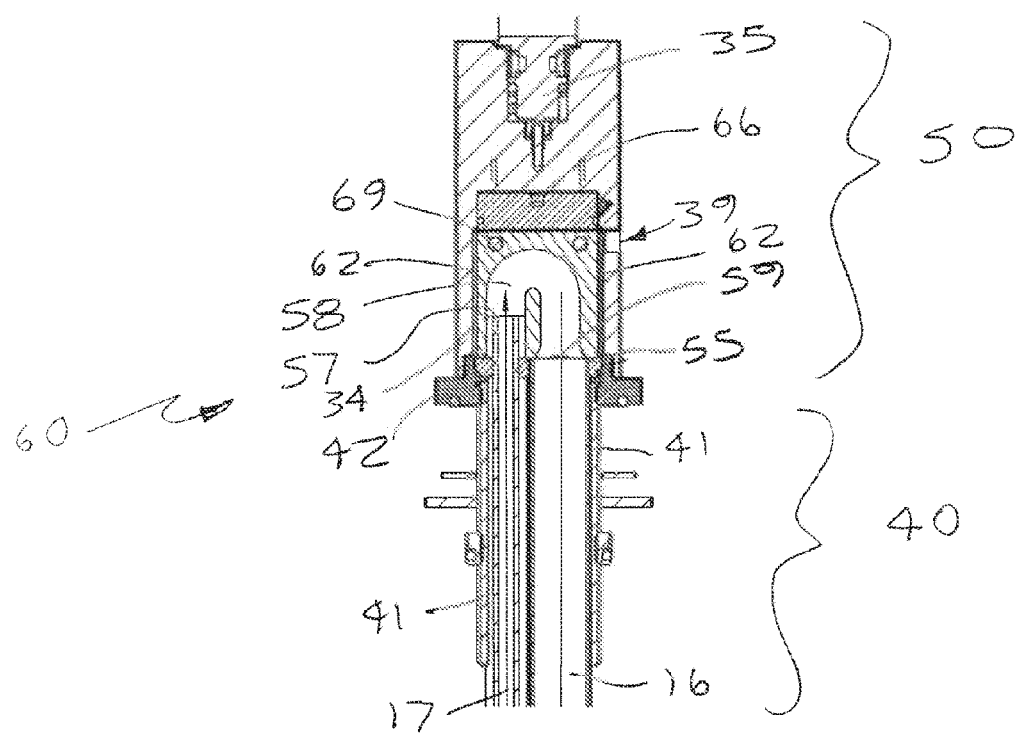
FIGS. 4A and 4B show cross-sectional views of an illustrative embodiment of an assembled faucet integrated with an air-gap device in accordance with the present invention.
Figure 4B:
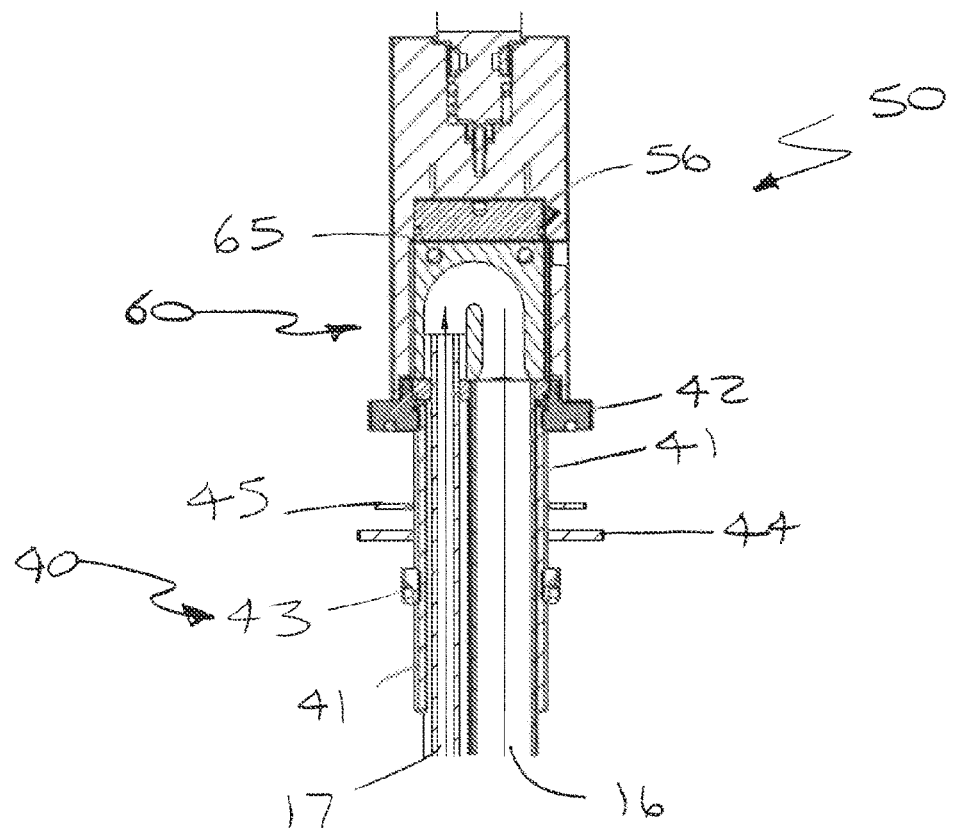

FIGS. 3, 4A, and 4B show an exemplary embodiment of an above-counter portion 50 and a below-counter portion 40 of the faucet/air-gap system 100. In some embodiments, the below-counter portion 40 (FIG. 4B) may include a hollow, substantially cylindrical portion 41 through which the hot 21 and cold water lines 23, as well as the input conduit 17 and the drain conduit 16, are disposed. In some variations, the hot 21 and cold water lines 23 are disposed adjacent to each other, retained in about one-half of the area of the substantially cylindrical portion 41, while the input conduit 17 and the drain conduit 16 are disposed adjacent to each other, retained in the other one-half of the area of the substantially cylindrical portion 41. An outer diameter of the cylindrical portion 41 may be sized so that the cylindrical portion 41 is able to fit cleanly or snugly in a conventionally sized faucet opening 24 in the counter 22 (FIG. 1) provided for the faucet/air-gap system 100. In some implementations, the cylindrical portion 41 is made of copper, brass, aluminum, stainless steel, or other structurally sound material. Advantageously, a distal end or upper portion of the cylindrical portion 41, which is closer to the counter 22 when properly installed, may be counter-threaded to accept threadings provided on a base nut 43. The mating threadings are structured and arranged to securely and removably attach the faucet base flange 42 and the cylindrical portion 41 to the counter 22.

In some variations, with the below-counter portion 40 of the faucet/air-gap system 100, a plurality of substantially circular or disk shaped sealing devices may be installed about the cylindrical portion 41 between the bottom of the counter 22 and the base nut 43. For example, closest to the bottom of the counter 22, a first sealing device 45, e.g., a rubber, elastomer, and the like washer, may be removably disposed on and about the outer, peripheral surface of the cylindrical portion 41, so as to abut the bottom of the counter 22. A second sealing device 44 e.g., a metallic (e.g., steel, aluminum, brass, and the like) washer, may be disposed between the first sealing device 45 and the base nut 43. In some variations, an outer diameter of the second sealing device 44 is larger than an outer diameter of the first sealing device 45. During installation, as torque is applied to the base nut 43, the threadings of the base nut 43 mate with the counter-threadings integrated into the upper portion of the cylindrical portion 41, causing the base nut 43 to move, forcing each of the first sealing device 45 and the second sealing device 44 together and against the bottom of the counter 22, providing a fluid-tight seal about the opening 24 in the counter 22.

In some implementations, referring to FIGS. 3 and 4A, the air-gap portion 60 may include a base portion 55, a wall portion 54, a removable block cover 52, and a crown portion 56. The base portion 55 may be disk-shaped and manufactured from a metal, alloy, hard plastic material, and the like. The base portion 55 may be dimensioned to provide a tight, interference fit with the faucet base flange 42 to create a fluid-tight seal. The faucet base flange 42 may be dimensioned to provide a tight, sliding fit with the faucet housing 34 to create a fluid-tight seal between the faucet base flange 42 and the faucet housing 34. In some embodiments, the base portion 55 is formed to include one or more openings, e.g., four openings, to accommodate the plurality of fluid lines and conduits 16, 17, 21, 23. In some implementations, the hot water 21 and cold water lines 23, as well as the inflow line 17 from the dishwasher 18 (FIG. 1), pass through, so as to extend beyond an upper face of the base portion 55, while the outflow or drain line 16 may be formed flush with an upper face of the base portion 55.

In some embodiments, the wall portion 54 of the air-gap portion 60 may be integral with or fixedly attached, e.g., bonded, welded, molded, and the like, and substantially perpendicular to the upper face of the base portion 55. The wall portion 54, which also may be manufactured from a metal, alloy, hard plastic material, and the like, may be structured and arranged to include a substantially planar surface 51 having a plurality of openings 61, for releasably securing the block cover 52 to the planar surface 51 to provide a substantially fluid-tight seal against the planar surface 51, and an outer, e.g., arcuate, surface 53 that may be configured to fit into the plenum of the faucet housing 34. The wall portion 54 may form openings for the hot water 21 and cold water lines 23. Advantageously, the wall portion 54 may be structured and arranged to isolate the hot water 21 and cold water lines 23 from the inflow 17 and outflow drain lines 16.

In some embodiments, the crown portion 56 may be integral with or fixedly attached, e.g., bonded, welded, molded, and the like, in a cantilever and substantially perpendicular to the wall portion 54. In some implementations, the crown portion 56 may be disk-shaped and manufactured from a metal, alloy, hard plastic material, and the like. The crown portion 56 may form openings for the hot water 21 and cold water lines 23. Advantageously, the crown portion 56 may be structured and arranged to isolate the hot water 21 and cold water lines 23 from the inflow 17 and outflow drain lines 16. The peripheral edge of the disk-shaped crown portion 56 may include a threaded opening 67, which may be configured to receive a fastening device 46 (FIGS. 2B and 2C) for releasably attaching the faucet housing 34 to the air-gap portion 60, and an annular groove 65 that is configured to retain a sealing device, e.g., an O-ring. Advantageously, when the faucet housing 34 is properly mounted over the air-gap portion 60, the sealing device in the annular groove 65 may provide a fluid-tight seal above the air-gap channel 58 to prevent pressurized drain water from going anywhere except through the overflow discharge outlet 39, in the event of a clogged drain. Furthermore, when properly mounted, an opening in the faucet housing 34 may be configured to register with the threaded opening 67 so that the fastening device 46, e.g., a screw, bolt, and the like, may be inserted through the opening 67 to releasably attach the housing 34 to the air-gap portion 60. Thus, a single fastening device 46 permits removal of the faucet housing 34, for maintenance or repair.

In some implementations, the hot water 21 and cold water lines 23 pass through, so as to extend beyond an upper face of the crown portion 56. The crown portion 56 may also include a key area 66 on an upper face at which a distal end of a faucet valve 35 may control the mixing temperature and flow volume of the hot and cold water flowing through the respective hot water 21 and cold water lines 23.

The removable block cover 52 may be provided with the air-gap portion 60 to facilitate clean-out of a blocked or clogged drain. Advantageously, successive access to the air-gap portion 60, to the block cover 52, and to the air-gap channel 58 and the blockage or clog is facilitated by enabling one to access each above-the-counter, rather than below-the-counter where the confined space beneath the sink is a jumble of pipes and conduits and other obstructions. In some embodiments, the removable block cover 52 may be manufactured from a metal, alloy, hard plastic material, and the like, and may be structured and arranged to include a front surface 68 that may include one or more channels that, when the block cover 52 is properly attached to the wall portion 54, may provide an outlet for pressurized waste water. A plurality of openings 69, e.g., two openings, may be formed in the block cover 52 to be in registration with the threaded openings 61 in the wall portion 54 when the block cover 52 is properly attached to the wall portion 54. Fastening devices 63, e.g., set screws, bolts, and the like, may be used to releasably secure the front surface 68 of the block cover 52 to the wall portion 54.

Advantageously, an air-gap channel 58 is formed into the block cover 52 at the front surface 68. In some applications, the air-gap channel 58 may be formed as a U-shaped channel that includes a shorter leg that is in fluid communication with the outlet 57 of the dishwasher inflow conduit 17 and a longer leg that is in fluid communication with the inlet 59 of the outflow drain conduit 16. In some variations, it may be desirable to have an outflow drain conduit 16 with a larger diameter than the inflow conduit 17. To accommodate this, the diameter of the U-shaped channel 58 may be sized to form a diameter that corresponds to the outer diameter of the outlet 57 of the inflow conduit 17; however, the longer leg may be belled out immediately adjacent to the inlet 59 of the outflow drain conduit 16.

The block cover 52 may be between about 1.5 and about 2 inches in height; between about 1.25 and about 1.75 inches in width; and about 0.5 to about 0.75 inches thick. In one implementation, the dimensions of the block cover may be 1.5 inches by 1.46 inches by 0.68 inches.

Those of ordinary skill in the art can appreciate that the legs of the U-shaped, air-gap channel 58 may actually be of the same length, such that one leg is not comparatively "longer" or "shorter" than the other. Recalling, however, that the inflow conduit 17 extends through the base portion 55, so that its outlet 57 is a short distance above the upper face of the base portion 55, as shown in FIGS. 4A and 4B, when the block cover 52 is properly attached to the wall portion 54, the distance from the outlet 57 of the inflow conduit 17 to the crown of the U-shaped channel is shorter than the distance from the inlet 59 of the outflow drain conduit 16. In such an instance, the former is the "shorter" leg while the latter is the "longer" leg.

In the event that a there is a clog or blockage in the outflow drain conduit 16 and/or the air-gap channel 58, a "fail safe" outlet 64, which is in fluidic communication with the air-gap channel 58, as well as with the overflow discharge outlet 39, may be formed in the block cover 52 to provide an ambient release outlet for fluid entering the air-gap channel 58 from the inflow conduit 17 that would otherwise drain into the outflow drain conduit 16. In some embodiments, the "fail safe" outlet 64 may be located in the block cover 52 so that the outlet 64 is between about 1.5 and about 2 inches above the counter top 22. In one implementation, the "fail safe" outlet 64 may be located in the block cover 52 so that the outlet 64 is about 1.85 inches above the counter top 22. In some variations, the "fail safe" outlet 64 may be located in the block cover 52 as close as possible to the air-gap base so that the outlet 64 is self-cleaning. An annular space 62 may be formed between the faucet housing 34 and the air-gap portion 60, when the faucet housing 34 is properly disposed on the faucet base flange 42 about the air-gap portion 60. The faucet base flange 42 may include an O-ring disposed in a groove formed in an underside thereof, to seal against the counter 22 and prevent liquid on the counter 22 from leaking into the sink base cabinet, especially in the event of a clog and discharge of waste water through the overflow discharge outlet 39. Advantageously, when the faucet housing 34 is properly disposed on the faucet base flange 42, the combination provides a fluid-tight seal at the faucet base flange 42, for example, due to a stepped flange sealed with an O-ring, thereby causing any discharging fluid to travel from the "fail safe" outlet 64 to the overflow discharge outlet 39 via the annular space 62. Consequently, fluid, e.g., dishwasher waste water, from the inflow conduit 17 that would otherwise drain into the outflow drain conduit 16 may be discharged into the sink 19 via the overflow discharge outlet 39 when the line 16 is clogged or otherwise blocked.

Advantageously, in some variations, the sealing arrangement may provide improved backflow prevention and/or prevent siphoning into a clean water source via the air-gap portion 60 by raising the effective flood level to the ambient overflow discharge outlet 39, rather than at the level of the "fail safe" outlet 64.

Having described the air-gap portion 60 integrated into the faucet 100, a method of accessing an obstructed fluid flow channel within the faucet 100 to clear a clog or blockage in the outflow drain conduit 16 and/or the air-gap channel 58 will now be described. Advantageously, removing the faucet base housing 34 and the removable block cover 52 of the faucet/air-gap system 100 may be performed above sink counter 22 level and, moreover, removing the faucet base housing 34 and the removable block cover 52 may be performed without detaching one or more of the lines or conduits 16, 17, 21, 23 fluidicly coupled to the air-gap portion 60.

Figure 5:
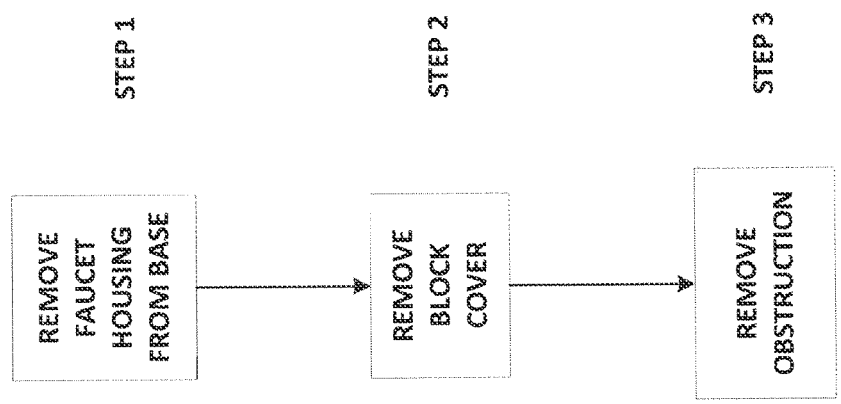
FIG. 5 shows a flow chart of a method of clearing an obstruction, clog, and/or blockage from the air-gap device in accordance with some embodiments of the present invention.

Referring to FIG. 5, in a first step, the homeowner, handyman, and/or plumber may remove the faucet base portion 34 (STEP 1), e.g., by removing a set screw, a bolt, and the like, that connects the faucet base portion 34 to the air-gap portion 60, exposing the latter. Fastening devices 67 may then be removed (STEP 2) to separate the block cover 52 from the air-gap portion 60, exposing the air-gap channel 58, inflow conduit 17, outflow drain conduit 16. With the air-gap channel 58, inflow conduit 17, outflow drain conduit 16, the cause of the clog or blockage may be apparent, in which case the clog or blockage may be removed manually (STEP 3). If the cause of the clog or blockage is not apparent, a snake or other plumbing tool may be inserted into the inflow conduit 17 and/or the outflow drain conduit 16.

O-ring seals on the hot and cold water conduits 21, 23 extending from the crown portion 56 align with corresponding inlets on the faucet base portion 34, affording reliable, fluid-tight connections without the need to separately connect or disconnect the fluid lines. Accordingly, the four supply and drain lines need only be connected to the air-gap portion 60 during initial installation. All subsequent maintenance or replacement of the upper faucet assembly 30 may be completed quickly and easily, without the need to disconnect any supply or drain lines It should be understood that alternative embodiments and/or materials used in the construction of embodiments, or alternative embodiments, are applicable to all other embodiments described herein.

The invention may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed is:

1. An air-gap device disposable on a surface within a faucet base of a faucet fixture, the air-gap device comprising:
   a base forming a plurality of flow channels;
   a fixed block wall extending from the base, the fixed block wall separating a first pair of flow channels from a second pair of flow channels and providing a fluid-tight seal for the first pair of flow channels;
   a removable block cover selectively attachable to the fixed block wall to fluidicly couple the second pair of flow channels, the cover forming an air-gap channel in fluidic communication with ambient; and
   a crown portion extending from the fixed block wall.

2. The air-gap device of claim 1, wherein the first pair of flow channels is structured and arranged to connect to a cold water supply line and a hot water supply line.

3. The air-gap device of claim 1, wherein the second pair of flow channels is structured and arranged to connect to a waste water line and a drain line.

4. The air-gap device of claim 3, wherein the drain line has an inner diameter that is greater than an inner diameter of the waste water line.

5. The air-gap device of claim 1, wherein the air-gap channel is substantially U-shaped.

6. The air-gap device of claim 5, wherein the U-shaped air-gap channel includes a pair of legs of unequal length.

7. The air-gap device of claim 6, wherein a longer leg of the U-shaped air-gap channel directs flow to a drain line.

8. The air-gap device of claim 6, wherein a shorter leg of the U-shaped air-gap channel receives flow from a waste water line.

9. The air-gap device of claim 1, wherein the removable block cover forms an aperture to provide fluidic communication between the second pair of flow channels and ambient.

10. The air-gap device of claim 9, wherein the aperture is formed proximate a drain line.

11. The air-gap device of claim 1 further comprising a plurality of conduits, each conduit of the plurality of conduits extending from the base and in fluid communication with a corresponding flow channel.

12. A faucet including an air-gap feature, the faucet comprising:
    an upper faucet assembly comprising:
        a fluid-carrying spigot having an inlet and an outlet for communicating a fluid therethrough,
        a valve in fluidic communication with the inlet of the spigot for selectively controlling at least one of a flow rate and a temperature of the fluid, and
        a faucet base housing having an overflow discharge outlet formed therethrough; and
    an air-gap device disposable on a surface and within the faucet base housing, the air-gap device comprising:
        a base forming a plurality of flow channels;
        a fixed block wall extending from the base, the fixed block wall separating a first pair of flow channels from a second pair of flow channels and providing a fluid-tight seal for the first pair of the flow channels;
        a removable block cover selectively attachable to the fixed block wall to fluidicly couple the second pair of flow channels, the cover forming an air-gap channel in fluidic communication with ambient; and
        a crown portion extending from the fixed block wall.

13. The faucet of claim 12, wherein the air-gap flow channel is in fluidic communication with the overflow discharge outlet in the faucet base.

14. The faucet of claim 12, wherein the faucet base housing is removably couplable to the air-gap device with a fastening device.

15. The faucet of claim 14, wherein the air-gap device is modular and couplable to a plurality of different faucet base housings.

16. The faucet of claim 12 further comprising a first seal and a second seal to direct overflow from the air-gap flow channel to the overflow discharge outlet in the faucet base housing.

17. The faucet of claim 16, wherein the first seal is removably attached to the base of the air-gap device.

18. The faucet of claim 16, wherein the second seal is removably attached to the crown portion.

19. The faucet of claim 16, wherein the first seal and the second seal are structured and arranged to raise an effective flood level to that of the overflow discharge outlet in the faucet base housing, to prevent at least one of siphoning into a clean water source and backflow.

20. The faucet of claim 12, wherein the first pair of flow channels is structured and arranged to connect to a cold water supply line and a hot water supply line.

21. The faucet of claim 12, wherein the second pair of flow channels is structured and arranged to connect to a waste water line and a drain line.

22. The faucet of claim 21, wherein the drain line has an inner diameter that is greater than an inner diameter of the waste water line.

23. The faucet of claim 12, wherein the air-gap channel is substantially U-shaped.

24. The faucet of claim 23, wherein the U-shaped air-gap channel includes a pair of legs of unequal length.

25. The faucet of claim 24, wherein a longer leg of the U-shaped air-gap channel directs flow to a drain line.

26. The faucet of claim 25, wherein a shorter leg of the U-shaped air-gap channel receives flow from a waste water line.

27. The faucet of claim 12, wherein the aperture is formed proximate a drain line.

28. The faucet of claim 12 further comprising a plurality of conduits, each conduit of the plurality of conduits extending from the air-gap base and in fluid communication with a corresponding flow channel.

29. A method of accessing an obstructed fluid flow channel within a faucet, the method comprising:
    providing a faucet having an upper faucet assembly comprising a faucet base housing and an air-gap device, the air-gap device comprising:
        a base forming a plurality of flow channels,
        a fixed block wall extending from the base, the fixed block wall separating a first pair of flow channels from a second pair of flow channels and providing a fluid-tight seal for the first pair of the flow channels,
        a removable block cover selectively attachable to the fixed block wall to fluidicly couple the second pair of flow channels, the cover forming an air-gap channel in fluidic communication with ambient, and
        a crown portion extending from the fixed block wall;
    removing the faucet base housing; and
    removing the block cover of the air-gap system.

30. The method of claim 29, wherein removing the faucet base housing and the removable block cover are capable of being performed without detaching any fluid lines from the faucet.

* * * * *